(12) United States Patent
Diepen et al.

(10) Patent No.: US 8,143,358 B2
(45) Date of Patent: Mar. 27, 2012

(54) INSTALLATION FOR GAS-PHASE POLYMERISATION

(75) Inventors: Paul J. Diepen, Hertogenbosch (NL); Stanislaus M. P. Mutsers, Geleen (NL)

(73) Assignee: Ineos USA LLC

( * ) Notice: Subject to any disclaimer, the term of this patent is extended or adjusted under 35 U.S.C. 154(b) by 0 days.

(21) Appl. No.: 12/379,231

(22) Filed: Feb. 17, 2009

(65) Prior Publication Data

US 2010/0016525 A1    Jan. 21, 2010

Related U.S. Application Data

(63) Continuation of application No. 10/344,991, filed as application No. PCT/NL01/00618 on Aug. 22, 2001, now abandoned.

(60) Provisional application No. 60/242,422, filed on Oct. 24, 2000.

(30) Foreign Application Priority Data

Aug. 31, 2000    (NL) ...................................... 1016073

(51) Int. Cl.
  *C08F 2/00*    (2006.01)
  *C08F 210/00*    (2006.01)
  *B01J 10/00*    (2006.01)

(52) U.S. Cl. ............. 526/65; 526/88; 526/348; 422/129
(58) Field of Classification Search .................... 526/65, 526/88, 901, 348; 422/129
See application file for complete search history.

(56) References Cited

U.S. PATENT DOCUMENTS

| | | | |
|---|---|---|---|
| 3,957,448 A | | 5/1976 | Shepard et al. |
| 4,640,963 A | | 2/1987 | Kreider et al. |
| 4,921,919 A | | 5/1990 | Lin et al. |
| 5,504,166 A | * | 4/1996 | Buchelli et al. .................. 526/60 |
| 6,069,212 A | * | 5/2000 | Hung et al. ...................... 526/65 |

FOREIGN PATENT DOCUMENTS

| | | |
|---|---|---|
| GB | 1 363 566 | 8/1974 |
| WO | WO 93/24533 | 12/1993 |

* cited by examiner

*Primary Examiner* — William Cheung
(74) *Attorney, Agent, or Firm* — David P. Yusko; James J. Drake; Vik Panchal

(57) ABSTRACT

Installation for the gas-phase polymerization of at least one olefinic monomer, comprising a horizontal stirred reactor (1) consisting of an undivided space, provided with a number of gas feeds (13a-13) in the bottom section of the reactor (1) and a number of liquid feeds (7a-7) in the top section of the reactor (1) and at least two gas outlets (9, 11) at the top of the reactor (1), the installation being provided with means (43, 45) to regulate the discharge capacities of the gas outlets.

4 Claims, 1 Drawing Sheet

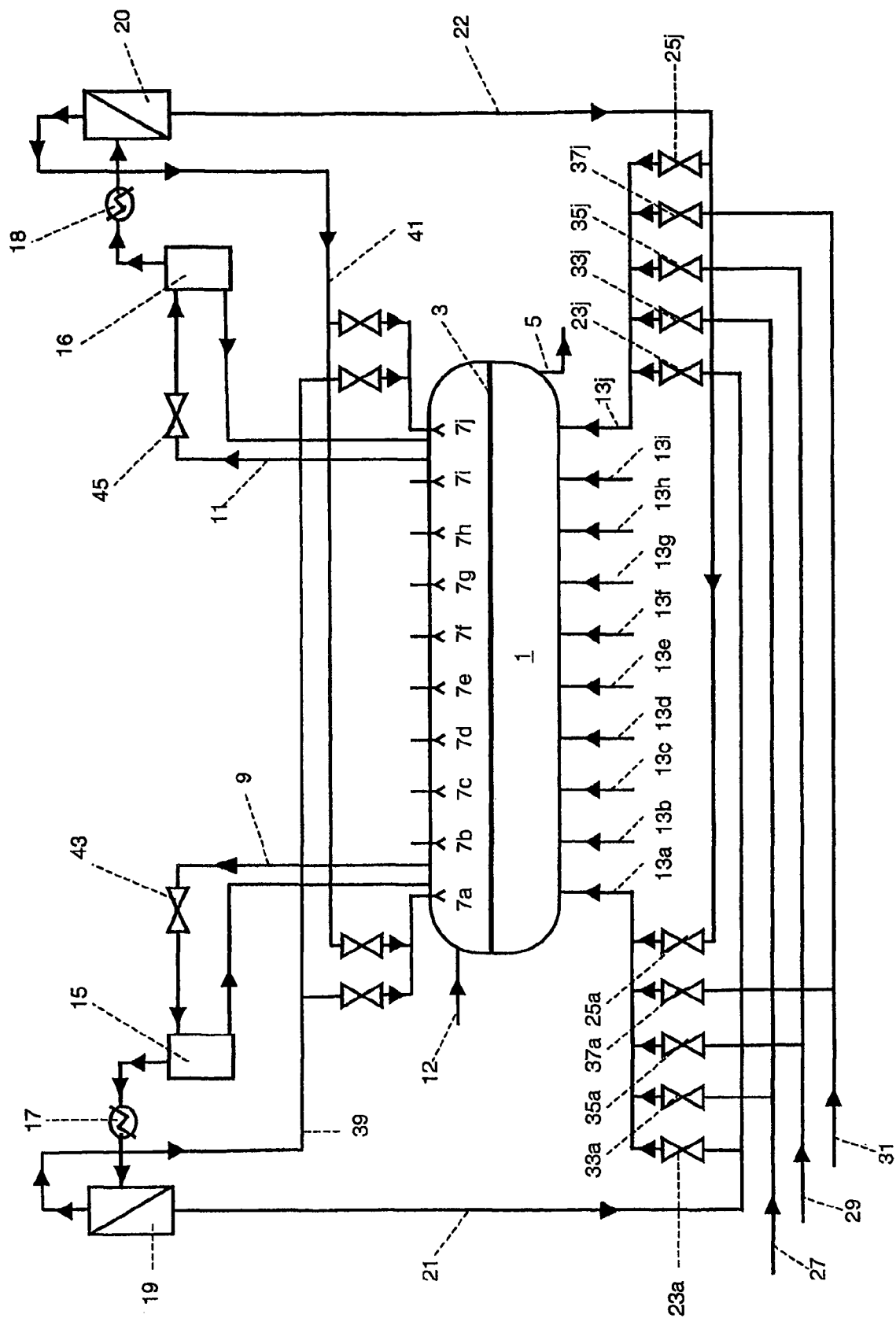

INSTALLATION FOR GAS-PHASE POLYMERISATION

CROSS REFERENCE TO RELATED APPLICATIONS

This application is a continuation of U.S. application Ser. No. 10/344,991, filed Aug. 27, 2003 now abandoned, which is the National Phase application of International Application No. PCT/NL2001/000618, filed Aug. 22, 2001, which designates the United States and was published in English, and which further claims the benefit of priority from U.S. Provisional Application No. 60/242,422, filed Oct. 24, 2000, and Netherlands Application No. 1016073, filed Aug. 31, 2000. These applications, in its entirety, are incorporated herein by reference.

BACKGROUND OF THE INVENTION

The invention relates to an installation for the gas-phase polymerisation of at least one olefinic monomer, comprising at least one horizontal stirred reactor, provided with a number of gas feeds in the bottom section of the reactor and a number of liquid feeds in the top section of the reactor and at least two gas outlets at the top of the reactor.

Such a reactor is known from U.S. Pat. No. 3,957,448. The cross-section of this reactor is substantially circular. In the centre of the reactor there is a longitudinal revolving shaft with blades that can stir a polymer bed. The blades preferably bring about no forward or backward transport of the polymer in the polymer bed.

The known reactor is divided into two or more compartments by means of one or more vertical partitions. Each compartment is provided with a number of its own gas feeds at the bottom and a number of its own liquid feeds at the top and a separate gas outlet at the top. This makes it possible to feed to each compartment its own reaction mixture, if desired differing from that in the other compartments, via the gas and the liquid feeds.

Via the liquid feeds at the top of the reactor liquid is fed which as a rule contains one or more components to be reacted, but can also contain inert components as coolant. Suitable inert components in case the reaction components comprise alkenes, are for example propane and higher alkenes. On contact with the polymer bed the liquid evaporates and this ensures that at least part of the heat of reaction released in the polymerisation is removed.

Gas is fed via the gas feeds at the bottom of the reactor. This gas likewise contains one or more components, for example hydrogen, or one or more olefinic monomers and can also contain inert components.

The unreacted olefinic monomers and inert gases from the supplied and evaporated liquid and gas collect at the top of the reactor and are removed from there through the gas outlets at the top of the reactor. The gases from the different compartments are thus removed separately and can also be processed separately and after processing returned to the gas and liquid feeds of the corresponding compartment. This is of great importance because the removed gases from the different compartments can have a different composition. Mixing the removed gases from the different compartments requires extra efforts to separate these again to make suitable flows to be fed to the different compartments.

The vertical partitions in the known reactor extend over the whole cross-section of the reactor in order to prevent exchange of gas between the different compartments. Because each compartment also has its own gas outlet, the desired separation of gas mixtures can take place outside the reactor. Transport of polymer particles from the one compartment to the other is made possible in the known reactor by openings in the partitions. These openings are situated under the surface of the polymer bed. Because the reactor is provided on one side with an outlet for the formed polymer powder a flow is set off in the reactor in the direction of that outlet.

The known installation is suitable to manufacture polymers of a mixed composition, with in a first compartment a polymer being prepared whose composition is determined by the gas composition and the reaction conditions in that first compartment. Via the openings in the partition the formed polymer powder then enters an adjoining, second compartment. If the gas composition or particular reaction conditions in this second compartment differ from those in the first compartment, then the polymer formed in this second compartment will differ in composition or in for example properties such as molecular weight or molecular weight distribution from the polymer formed in the first one. The polymer finally removed from the reactor at the end of the last compartment thus has a mixed composition, for example a bimodal molecular weight distribution, or is in essence a very homogeneous mixture of two or more polymers, each having a different composition.

A disadvantage of the known reactor lies in the fact that the compartments are separated by physical, fixed walls and thus have a fixed size. This seriously limits the scope to choose for example the relative proportions of the polymer components in the mixed compositions.

BRIEF SUMMARY OF THE INVENTION

The aim of the invention is to provide an installation that does not exhibit this limitation or only to a lesser extent.

This aim is achieved according to the invention in that the reactor is undivided and is provided with means to regulate the discharge capacity of the gas outlets. An undivided reactor in this context is a reactor in which partitions, dividing the reactor in two or more compartments, are absent.

Surprisingly it was found that in such an installation without physical partions being present, it is possible to produce polymers of a mixed composition, while preserving the desired separation in the discharge of the gases from the reactor.

BRIEF DESCRIPTION OF THE INVENTION

The invention will be further explained on the basis of a suitable embodiment of the installation such as shown in the following drawings.

FIG. 1 is a schematic view of a reactor suitable for an installation according to the invention.

DETAILED DESCRIPTION OF THE INVENTION

In the reactor, the off-gases present above the polymer bed will be distributed over the gas outlets, with between two gas outlets in the space above the polymer bed an interface being formed between the gases that flow to and are discharged via the one gas outlet and those that flow to and are discharged via the other gas outlet. With the aid of the means to set the discharge capacity of the gas outlets it has now been found possible to set the place of this interface. This gives a large flexibility in dividing the reactor into virtual compartments of desired size to which gases differing in composition can be fed.

Thus one is no longer bound by a fixed compartment size ratio, nor, consequently, by a fixed ratio between the components of the mixed-composition polymer, determined by the place of the partition. This ratio can be chosen within broad limits in the reactor in the installation according to the invention. Due to the possibility to set the place of the interface in the gas discharge it can always be ensured that different separately supplied gases in composition can also be removed separately and can be recycled simply.

If two gas outlets are present these can for example be positioned at ¼ and ¾ respectively from an outer end of the section of the reactor in which the actual polymerisation takes place. The interface will lie between the two outlets and can consequently be set across half the length of the reactor. If a larger variation in the place of the interface is desired, it will be advantageous to move the gas outlets further towards the outer ends of the reactor. The same applies for the two outlets that are furthest towards the outer ends of the reactor in the case that more than two gas outlets are present in the reactor.

The mechanism and the effectuation of polymerisation reactions in the reactor such as those in the installation according to the invention are known per se and are described in detail in for example U.S. Pat. No. 3,957,448. What is disclosed therein, in particular in respect of place, method and, quantities of input of gases and liquids to the reactor, the method of recovery of the gases removed from the reactor and the method of removing the formed polymer, is completely applicable to the operation of the installation according to the invention, taking into account the further and deviating characteristics published in the present description.

The installation according to the invention is especially suitable, in particular with application of the method described in the following, for the gas-phase preparation of polymers from an olefinic monomer and optionally one or more comonomers copolymerisable with these. In the formed polymer several types of comonomers can be present. The olefinic monomer, which is predominantly present, can be for example an α-olefin or styrene. The α-olefin can be branched or unbranched and can contain 2-12 carbon atoms. Preferably use is made of ethylene and/or propylene.

The comonomer copolymerisable with the olefinic monomer can be another olefinic monomer, but also conjugated and non-conjugated dienes are suitable. Preferably the comonomer is chosen from the group consisting of α-olefins with 2-12 carbon atoms and conjugated and non-conjugated dienes with 4-20 carbon atoms. Preference is given to ethylene, propylene, butene-1, isobutene, hexene-1,4-methylpentene-1 or octene-1 as the α-olefin. The diene used preferably is 1,4-butadiene, 1,6-hexadiene, ethylidene norbonene, vinyl norbornene, or dicyclopentadiene. Besides homopolymers of ethylene or propylene, in the installation according to the invention also copolymers of these two monomers can be prepared, as well as copolymers of these monomers together or separately with one or more higher olefins and/or dienes.

The invention also relates to a process for the gas-phase polymerisation of at least one olefinic monomer in an installation that comprises at least one horizontal stirred reactor consisting of an undivided space which is provided in the bottom with a number of gas feeds and in the top with a number of liquid feeds, the gas feeds and liquid feeds being divided into corresponding separate groups, and which is provided in the top with at least two gas outlets for removing gases from the reactor which are each connected to their own recovery unit, said process comprising:

feeding a catalyst system to the reactor, feeding different gas compositions comprising the at least one olefinic monomer a selected group of gas feeds and accordingly adjusted liquid compositions to the corresponding liquid feeds, removing the reacted gaseous components through the gas outlets, with the ratio of the discharge capacities of the gas outlets being adjusted so that the gases coming from a group of gas feeds and a corresponding group of liquid feeds are mainly removed through one gas outlet removing the obtained polymer from the installation.

The polymerization is carried out in the presence of a catalyst system, at least comprising a transition metal compound as a catalyst and a co-catalyst. As catalyst in these processes use can be made of multiple-site catalysts, for instance Ziegler-Natta catalysts, but also of single-site catalysts, for instance metallocene catalysts. The processes known per se for the preparation of above mentioned polymers in a gas-phase process can be carried out in the installation according to the invention, in which case the said advantages of the invention are achieved.

The transition metal in the transition metal compound is chosen from groups 4-6 of the Periodic Table of the Elements (Newest IUPAC notation); more preferably, the transition metal is chosen from group 4; the greatest preference is given to titanium (Ti) as transition metal. The catalyst is generally supported on an inert carrier, like $MgCl_2$ or $SiO_2$, generally in combination with a so-called internal donor compound.

The co-catalyst generally is an organo metal compound, and preferably an organo-aluminum compound. Most preferred are alkylaluminum compounds.

Also an external donor compound can be present in the catalyst system, like alkoxy silanes.

All the components of the catalyst system, suitable for the polymerisation of one or more olefinic monomers, are known in the art per se, of which the man skilled in the art is aware.

In FIG. 1, 1 is a cylindrical reactor with a shaft 3, to which a stirrer (not shown in the FIGURE) is fixed. The stirrer consists preferably of blades which are fitted to the shaft 3 and which, when shaft 3 rotates, keep a polymer bed present in the reactor in motion, but with as little as possible movement of the polymer bed in an axial direction. 5 is a discharge for formed polymer. As a rule the discharge capacity is set so that the moving polymer bed fills 30-80% of the reactor volume. 7a-7j are liquid feeds; 9 and 11 are two gas outlets; 13a-13j are gas feeds.

As a rule the distribution of the gas and liquid feeds along the reactor preferably has been chosen so that continually a gas and a liquid feed are present in a same plane perpendicular to the axial direction of the reactor. 12 is a device for feeding a catalyst system. The catalyst system is usually supplied to the top part of the reactor and, optionally mixed with part of the liquid to be supplied, trickled or sprayed on the polymer bed. The catalyst can be supplied mainly at the point where the reaction starts, i.e. the end situated farthest from the discharge for the polymer, but if desired can also be distributed over the length of the reactor.

The gas mixture removed via gas outlets 9 and 11 from the space above the polymer bed is fed to separate recovery units. In these recovery units the removed gas is recovered according to techniques known per se, starting with the removal of entrained polymer particles by separators 15 and 16, respectively. The separated polymer particles are returned to the reactor. Subsequently the gas flow stripped of polymer particles is cooled in heat exchangers 17 and 18, respectively. In gas-liquid separators 19 and 20, respectively, the resulting gas-liquid mixture is split into a gaseous composition suitable to be returned to the reactor via the gas feeds 13a-13j and a liquid part that can be returned to the reactor via liquid feeds 7a-7j, for example as described in U.S. Pat. No. 3,597,448.

Gas lines 21 and 22 are each linked to gas feeds 13a-13j by means of a metering device, for example a controllable valve. In the FIGURE only part of the control valves are shown, namely 23a, 25a, 23j and 25j, but such metering devices are present at each of the gas feeds. It is not necessary to connect each of the gas lines 21 and 22 to all gas feeds. Usually a smaller overlap of feeds is sufficient, depending on the desired scope in the choice of the ratio between the compartments. Line 21 for instance can be connected to 13a, b, c, d, e or f and line 22 to 13d, e, f, g, h, i or j. The same applies to connection of the lines 39 and 41 to the liquid feeds 7a-7j. 27, 29 and 31 indicate three lines for making up the recycled gas to the desired composition of the gas to be fed via the gas feed to the reactor. For example monomers or hydrogen consumed in the polymerisation can be supplemented. These lines 27, 29 and 31, if desired increased to a larger number if more components must be added, are also each connected to each of the gas feeds by means of a metering device. Again, of these devices only valves 33a, 35a, 37a, 33j, 35j and 37j are shown in the FIGURE.

Through suitable setting of the metering devices it is now possible to divide the reactor into two virtual compartments, each with its own gas supply composition, for example with its own olefin monomer composition. The point where there is a transition from the one composition to the other is to be chosen in steps corresponding to the size of the distance between two consecutive gas inputs and thus the ratio of the sizes of the two virtual reactor components. By increasing the number of gas and liquid feed points 7 or 13 this step size can be reduced. Thus, gas of a first composition can be fed to a first group of gas feeds, for example consisting of 13a through 13d, and gas of a second composition to an adjoining group of gas feeds, consisting of 13e through 13j.

Correspondingly, lines 39 and 41, coming from the gas-liquid separators 19 and 20, are connected to the liquid feeds 7a-7j by means of metering devices, for instance control valves: Here, too, provisions can be present for feeding extra components, as described for the gas feeds. These are not shown in the FIGURE. Analogous to the above-described way of dividing the gas feeds into two groups, each with its own gas composition, the liquid feeds are as a rule also divided into two corresponding groups, for example consisting of 7a through 7d or 7e through 7j. It is not necessary for the gas and liquid feeds to have an identical distribution. In the case given above as an example the liquid feeds can also be divided in other way, for example into a group consisting of 7a-7d and a group consisting of 7f-7j. To feed 7e for example a liquid of a third composition can be fed then, for example an inert composition to accomplish a separation between the two groups.

A group of gas feeds and a group of liquid feeds are labelled 'corresponding' here if the components supplied through them are adjusted to each other in terms of composition and quantity with a view to preparing from the jointly supplied components a desired type of polymer. This implies that correspondence in terms of place and number is not necessary, although corresponding groups will as a rule for the greater part coincide in the axial position. In the same way, a discharge and the gas and liquid feeds to which the components removed through the discharge after the recovery unit are primarily added are designated as corresponding herein.

The quantity and composition of the gas supplied and the liquid supplied are further chosen in mutual dependence such that the overall composition and quantity of the components supplied is geared to an optimum proceeding of the intended polymerisation reaction in the relevant part of the reactor.

The reactor is thus divided into two virtual compartments, each with its own reaction mixture, in each of which a different polymer is formed. It is also possible, if desired, to supply a different catalyst system to each of the compartments, each chosen as the most suitable in the light of the polymer to be prepared in each of the compartments.

The composition of the gas and liquid supplied will as a rule be different for the two virtual compartments. The liquid metered to and evaporating in a virtual compartment and the gas rising through the bed from a gas feed will collect as off-gases in the space above the polymer bed. Each gas outlet is situated in one of the virtual compartments and is indicated as the gas outlet corresponding to it. It is advantageous if the off-gases are removed to the recovery unit from which the relevant gas and liquid supplies are fed, because then in the off-gases in principle no extraneous components, i.e. not supplied by the relevant group of gas and liquid feeds, are present.

If part of the gas mixture is removed from a particular compartment via a gas outlet other than the corresponding one, components that must not be returned to the gas and liquid supplies fed by that recovery unit can enter the recovery unit placed after it. Such a component would have to be removed then, which makes the recovery unit technically more complicated and more expensive.

To prevent this at least one of the gas outlets 9 and 11 is provided now with a device 43 or 45 with which the discharge capacity of the relevant gas outlet can be set, for example an adjustable valve. However, the total discharge capacity of the gas outlets must always be sufficient to be able to remove the total quantity of gas supplied, as gas or as vaporable liquid. Preferably both gas outlets are provided with a device to set the discharge capacity.

If the discharge capacities of the two gas outlets are equal the gas collecting above the polymer bed will divide over the two gas outlets. An interface can be indicated between the gases that move to the one gas outlet and those that move to the other gas outlet. This interface is characterised by the fact that the net gas flow through it is zero. The position of this interface depends on the distribution over the different feeds of the total quantity of gas and vaporable liquid that is fed to the reactor. Thus for example the polymerisation will in general proceed fastest in the first part of the reactor, so that more cooling inert liquid must be fed to that section than to the section situated closer to the polymer discharge 5. In each situation, however, a defined interface will arise. By increasing the discharge capacity of the one gas outlet and reducing that of the second accordingly now, said interface will move in the direction of the gas outlet with the reduced discharge capacity. Thus a situation can be achieved in which in line with the virtual compartmentalization that is effected by choosing the point where the gas and liquid feed switches from one composition to the other, the discharge of the off-gases is so distributed that the off-gases of each compartment are discharged via the corresponding gas outlet. A straight link is thus established between the gas discharged and the gas and liquid returned via the recovery arrangement. As a result, admixture of unwanted components is to a great extent prevented.

Determination of the desired position of the interface can be effected using the composition of the off-gases as a control variable. If a particular component that has been fed to a first compartment is found to be present in an unwanted quantity in the gas outlet through which the off-gases of an adjoining compartment are discharged, the interface can be shifted in the desired direction by adapting the ratio of the discharge capacities of the gas outlets. The reactor is therefore preferably provided with means to determine the composition of the gases discharged through the gas outlets. A suitable example of this is a process gas chromatograph that is connected via a by-pass or sampling line to each of the gas discharge lines 9 and 11. A more accurate positioning of the interface can be achieved when the reactor is provided with means, for example gas chromatographs or other gas analysis instruments, to determine the composition of the gases that are present in the top of the reactor, i.e. the space above the polymer bed. By determining this composition at a number of points in that space the current position of the interface can be determined accurately.

More preferably the means that determine the composition of the off-gases control the means that regulate the discharge capacities of the gas outlets. For this purpose use can be made of industrial measuring and control equipment known per se.

Although the reactor is equipped with a revolving shaft with blades that preferably impart to the polymer bed preferably no movement in the axial direction, the rising of the gas supplied at the bottom may still cause some spreading due to dispersion where the gas reaches the surface of the polymer bed. As a result a certain quantity of gas that is fed to the one virtual compartment will go to the other side of the interface that can be conceived as separating the virtual compartments in the space above the polymer bed. This quantity can for example lie between 2 and the 5%. Without further measures a certain quantity of the discharged gases will thus go to a non-corresponding gas outlet and consequently to a recovery unit other than the intended one.

To what extent this is serious depends on the differences between the compositions that are supplied with each of the groups of gas and liquid feeds. These differences can relate for example to the ratios between the components, but it may also occur that to the one compartment components are fed that are not present in the feed to the other compartment. Examples of this are hydrogen and one or more comonomers. As a rule it is undesirable that such components are fed via the recovery unit to the other compartment, for example because as a consequence of this the polymerisation aimed at in that compartment would be disturbed or the properties of the polymer to be formed would be influenced in an undesirable way.

In the case that the differences only lie in the ratios between various components some mixture can be permitted. This can be readily corrected by means of extra feed of a component via the feeds 27, 29 and 31 or by removing a component in the recovery unit. In that case the ratio between the two discharge capacities can be set so that the interface in the gas discharge is situated at a point situated between the last gas and liquid feed of the first group and the first, adjoining gas and liquid feed of the further group. In a situation as described above the interface then lies between feed 7d and 7e and, respectively, 13d and 13e.

In the case that the one composition contains a component which should not occur or should occur only in a very small quantity in the other composition it is advantageous to set the two discharge capacities so in relation to each other that the virtual interface in the gas discharge will lie further towards the gas outlet in which the relevant component is not wanted. This can be achieved simply by reducing the discharge capacity of the relevant gas outlet and increasing that of the other correspondingly.

Through analysis of the gas composition in that relevant gas outlet it can be established whether the unwanted component no longer occurs in it or still only in the quantities permissible in view of the polymerisation or not harmful to the properties of the polymer to be formed, and if necessary the discharge capacities can be adjusted. The small quantity of the composition in which the relevant component is missing and which component thus goes to the other gas outlet is as a rule acceptable and a correction for the presence thereof can be made simply as described above. The discharge capacities are set so that no quantity of the unwanted components or components harmful to the polymerisation or the properties of the polymer to be formed ends up in the non-corresponding gas outlet. Which quantity is harmful depends on the specific component in conjunction with the polymerisation reaction in the relevant compartment and is easy to determine for the person skilled in the art or even already known for the most common polymerisation reactions.

If in both compositions a component occurs whose presence in the other is undesirable, it is possible, in addition to the shifting of the interface as described above, to omit in one or more gas and/or liquid feeds that separate the two groups the supply of all components that are undesirable in any composition. In the above-described case the compositions in the feeds 7d and/or 7e and 13d and/or 13e could be adjusted in this way. As a consequence of this, in a small part of the reactor a polymer may be formed which deviates slightly from the polymer formed in the virtual compartments before it and after it, but in general this will only have a very small influence on the properties of the ultimately mixed polymer composition. It is also possible to feed to these separating inlets only inert components, so that the total production capacity possibly decreases somewhat, but the formation of a deviating polymer composition is prevented.

If in none of the two groups of feeds components occur that are harmful to the polymerisation in the non-corresponding compartment, flows from the one recovery unit can optionally be used to achieve the desired composition in the feeds of the non-corresponding compartment.

Besides the above-described embodiment it is also possible to divide the gas and liquid feeds into more than two groups, each with each their own gas or liquid composition supply. The reactor is then divided into more than two virtual compartments. The off-gases from several virtual compartments can be removed then, depending on the nature of the differences in said compositions, through a common gas outlet or each through its own corresponding gas outlet. In the latter case the reactor must be provided with more than two gas outlets.

The invention claimed is:

1. An apparatus the gas-phase polymerization of at least one olefinic monomer, comprising at least one horizontal stirred reactor, provided with a number of gas feeds in the bottom section of the reactor and a number of liquid feeds in the top section of the reactor and at least two gas outlets, wherein each gas outlet is connected to its own recovery unit for the gases removed through that gas outlet, at the top of the reactor, wherein the reactor is undivided and is provided with metering devices to set the discharge capacities of the gas outlets, gas chromatograph via a by-pass line to determine the composition of the oases removed through the as outlets and means to determine, at a number of points, the composition of the gases that are present in the to of the reactor, wherein the gas chromatograph actuates the metering devices.

2. Process for the gas-phase polymerization of at least one olefinic monomer in the apparatus of claim 1, said process comprising:

feeding a catalyst system to the reactor, feeding different gas composition comprising the at least one olefinic monomer to a selected group of gas feeds and accordingly adjusted liquid compositions to the corresponding liquid feeds, removing the reacted gaseous components through the gas outlets, with the ratio of the discharge capacities of the gas outlets to the discharge capacities of the liquid feeds being adjusted so that the gases coming from a group of gas feeds and a corresponding group of liquid feeds are each removed through one corresponding gas outlet, removing the obtained polymer from the reactor.

3. Process according to claim 2, wherein the ratio between the discharge capacities of the gas outlets is adjusted so that components that are fed to a first group and which can be harmful to the polymerization within another group are removed in at most a non-harmful quantity.

4. Process according to claim 2, wherein the gas feeds and liquid feeds are arranged in alternating fashion, wherein the gas feeds and liquid feeds are separated by one or more gas feeds or liquid feeds, respectively, to which a gas composition or a liquid composition, respectively, is fed in which the harmful components are absent.

* * * * *